US012657984B2

(12) United States Patent
Yamauchi et al.

(10) Patent No.: US 12,657,984 B2
(45) Date of Patent: Jun. 16, 2026

(54) MONEY HANDLING APPARATUS AND METHOD OF OUTPUTTING INFORMATION

(71) Applicant: GLORY LTD., Hyogo (JP)

(72) Inventors: Ayaka Yamauchi, Hyogo (JP); Shigeo Namura, Hyogo (JP); Ryuji Kataoka, Hyogo (JP)

(73) Assignee: GLORY LTD., Hyogo (JP)

( * ) Notice: Subject to any disclaimer, the term of this patent is extended or adjusted under 35 U.S.C. 154(b) by 0 days.

(21) Appl. No.: 19/071,798

(22) Filed: Mar. 6, 2025

(65) Prior Publication Data

US 2025/0285489 A1 Sep. 11, 2025

(30) Foreign Application Priority Data

Mar. 8, 2024 (JP) ................................ 2024-035746

(51) Int. Cl.
*G07D 11/23* (2019.01)
*G07D 11/34* (2019.01)

(52) U.S. Cl.
CPC ............. *G07D 11/23* (2019.01); *G07D 11/34* (2019.01)

(58) Field of Classification Search
CPC ........ G07D 11/23; G07D 11/34; G07D 11/24; G07D 1/00
See application file for complete search history.

(56) References Cited

U.S. PATENT DOCUMENTS 8,225,988 B1 7/2012 Bohen
2012/0012436 A1* 1/2012 Nakamoto ............ G07D 11/50 194/215
2013/0041809 A1* 2/2013 Ino .......................... G07C 9/38 109/23
2014/0074708 A1* 3/2014 Bellamy ............... G06Q 40/02 705/43
2021/0056794 A1* 2/2021 Nakamoto ............ G07D 11/60
2022/0301381 A1* 9/2022 Yukawa ................ G07D 11/14

FOREIGN PATENT DOCUMENTS

AU 2019478931 A1 6/2022
JP 2002-056437 A 2/2002

OTHER PUBLICATIONS

Extended European Search Report for application No. 25162247.8, dated Jul. 22, 2025.

* cited by examiner

*Primary Examiner* — Tuyen K Vo
(74) *Attorney, Agent, or Firm* — Shih IP Law Group, PLLC

(57) ABSTRACT

To increase the possibility of operating a money handling apparatus smoothly, a money handling apparatus according to an aspect of the present disclosure includes: a mixed storage unit configured to store a plurality of types of money; and a control unit that, for each type of money, compares the number of money stored in the mixed storage unit with a predetermined number set for the type of money, outputs information indicating a first situation in a case of the first situation, and outputs information indicating a second situation in a case of the second situation, the first situation being a situation where the number of money is larger than the predetermined number set for the type of money, the second situation being a situation where the number of money is smaller than the predetermined number set for the type of money.

13 Claims, 5 Drawing Sheets

MONEY HANDLING APPARATUS AND METHOD OF OUTPUTTING INFORMATION

CROSS REFERENCE TO RELATED APPLICATIONS

This application is entitled and claims the benefit of Japanese Patent Application No. 2024-035746, filed on Mar. 8, 2024, the disclosure of which including the specification, drawings and abstract is incorporated herein by reference in its entirety.

BACKGROUND ART

Conventionally, a coin processing machine is known that enhances the storage performance of coins in a storage unit by checking so as to allow acceptance until the total volume of coins of different denominations exceeds the storage limit volume of the storage unit.

The coin processing machine is known that includes a storage unit for storing mixed denominations, and imposes a deposit restriction by providing a limit on the number of coins for each denomination.

SUMMARY

In a coin processing machine including a storage unit as known, if a certain denomination is stored in the money processing machine in a biased manner, the time required for withdrawing money increases or the ease of withdrawal of coins of a desired denomination decreases, which may lead to a risk of inhibiting smooth operation the coin processing machine, such as the excessive time required for withdrawing money.

In view of the above-described problems, an object of the present disclosure is to provide a technology that can increase the possibility of smoothly operating a money handling apparatus.

A money handling apparatus according to an aspect of the present disclosure includes: a mixed storage unit configured to store a plurality of types of money; and a control unit that, for each type of the plurality of types of money, compares the number of money stored in the mixed storage unit with a predetermined number set for the type of money, outputs information indicating a first situation in a case of the first situation, and outputs information indicating a second situation in a case of the second situation, the first situation being a situation where the number of money is larger than the predetermined number set for the type of money, the second situation being a situation where the number of money is smaller than the predetermined number set for the type of money.

A method according to an aspect of the present disclosure includes is a method of outputting information on a money in a money handling apparatus including a mixed storage unit configured to store a plurality of types of money, the method including: acquiring information on the number of money stored in the mixed storage unit and a predetermined number set for the plurality of types of money; and comparing, for each type of the plurality of types of money, the number of money stored in the mixed storage unit with a predetermined number set for the type of money, outputs information indicating a first situation in a case of the first situation, and outputs information indicating a second situation in a case of the second situation, the first situation being a situation where the number of money is larger than the predetermined number set for the type of money, the second situation being a situation where the number of money is smaller than the predetermined number set for the type of money.

According to an aspect of the present disclosure, it is possible to enhance the possibility of smoothly operating a money handling apparatus.

DESCRIPTION OF EMBODIMENTS

Figure 1:
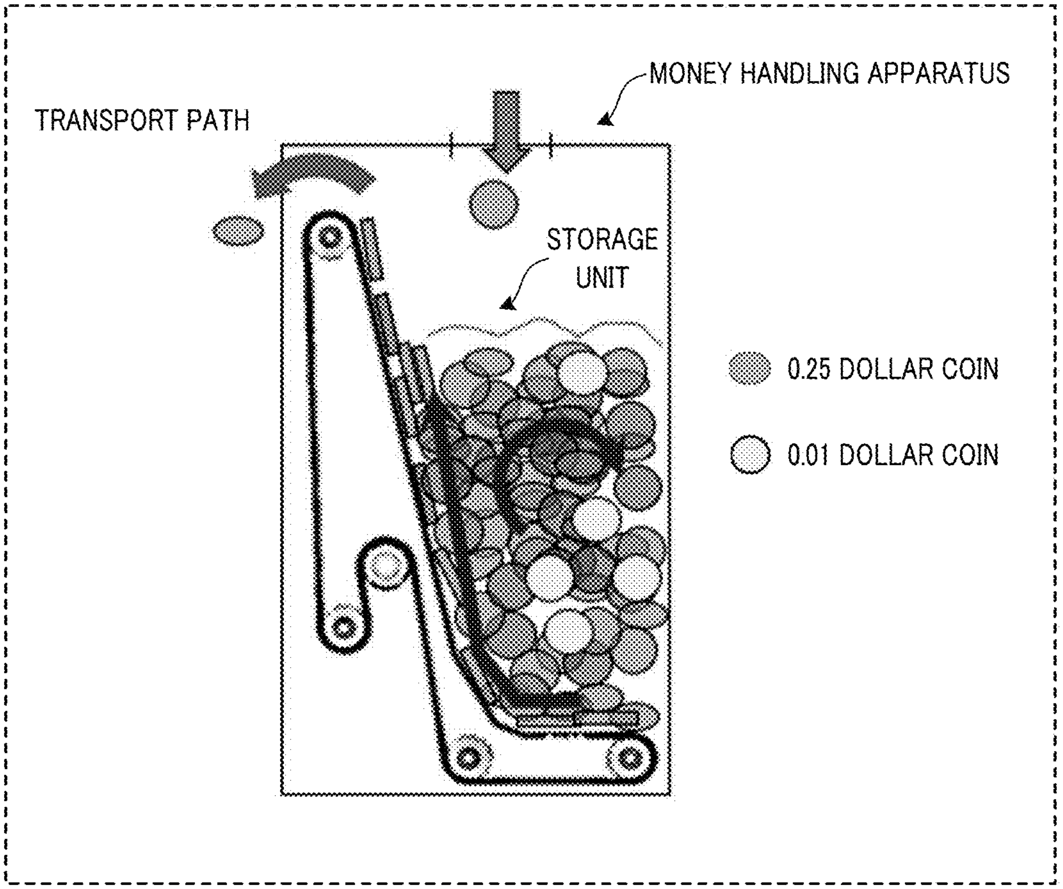
FIG. 1 is a diagram illustrating a state in which a certain type of coin is stored in a biased manner in a storage unit capable of storing a plurality of types of coins in a money handling apparatus.

A money handling apparatus according to an aspect of the present disclosure includes: a mixed storage unit configured to store a plurality of types of money; and a control unit that, for each type of the plurality of types of money, compares the number of money stored in the mixed storage unit with a predetermined number set for the type of money, outputs information indicating a first situation in a case of the first situation, and outputs information indicating a second situation in a case of the second situation, the first situation being a situation where the number of money is larger than the predetermined number set for the type of money, the second situation being a situation where the number of money is smaller than the predetermined number set for the type of money.

In an example, for each type of the plurality of types of money, the control unit calculates a first number and outputs information indicating the first number, the first number being obtained by subtracting the number of money stored in the mixed storage unit from the predetermined number set for the type of money.

In an example, in a case where a first type of money among the plurality of types of money is newly stored in the mixed storage unit, the control unit outputs information indicating a second number, the second number being obtained by subtracting the number of the first type of money newly stored in the mixed storage unit from the first number corresponding to the first type of money.

In an example, in a case where a second type of money among the plurality of types of money is newly stored in the mixed storage unit and the number of the second type of money stored in the mixed storage unit exceeds a predetermined number set for the second type of money, the control unit calculates a third number and performs control to eject the second type of money by the third number, the third number being obtained by subtracting the predetermined number set for the second type of money from the number of the second type of money stored in the mixed storage unit.

In an example, in a verification process for determining an inventory amount of the money in the money handling apparatus, the control unit does not perform control to eject a third type of money even when the third type of money among the plurality of types of money is newly stored in the mixed storage unit and the number of the third type of money stored in the mixed storage unit exceeds a predetermined number set for the third type of money.

In an example, the plurality of types of money includes a plurality of types of coins; and when performing a collection process, the control unit performs control to preferentially collect a coin when the number of plurality of types of coins stored in the mixed storage unit is larger than a predetermined number set for the coin among the plurality of types of coins.

First, an example of a problem that occurs in a money handling apparatus including a storage unit capable of storing a plurality of types of coins will be described.

FIG. 1 is a diagram illustrating a state in which a certain type of coin is stored in a biased manner in a storage unit capable of storing a plurality of types of coins in a money handling apparatus.

The storage unit illustrated in FIG. 1 is in a biased state in which a large number of 0.25 dollar coins are stored. If an attempt is made to collect five 0.01 dollar coins in this state, the transport of the 0.01 dollar coins to the transport path may take time, thus potentially causing a timeout in the process and resulting in the failure to collect the desired amount.

Further, at present, in amount collection, the number of coins to be collected is calculated to be the minimum configuration number for the collection amount. For this reason, the money handling apparatus at present, which does not take into account the bias described above, may take time to transport the coin to the transport path, resulting in a timeout in the processing and collecting only an amount less than the specified amount.

To avoid or suppress such a situation, it is useful to have the user of the money handling apparatus (for example, an employee or clerk of a store where the money handling apparatus is installed, a customer who deposits money into the money handling apparatus and receives change, etc.) comply with the appropriate number described above, so that the operation of the money handling apparatus can be performed smoothly.

Hereinafter, an embodiment according to an aspect of the present disclosure will be described with reference to the drawings. Note that the embodiments described below are merely examples, and the embodiments to which the present disclosure is applied are not limited to the following embodiments.

EMBODIMENTS

Hereinafter, embodiments of the present disclosure will be described with reference to the drawings.

Configuration of Money Handling Apparatus

First, a configuration of a money handling apparatus will be described.

Figure 2:
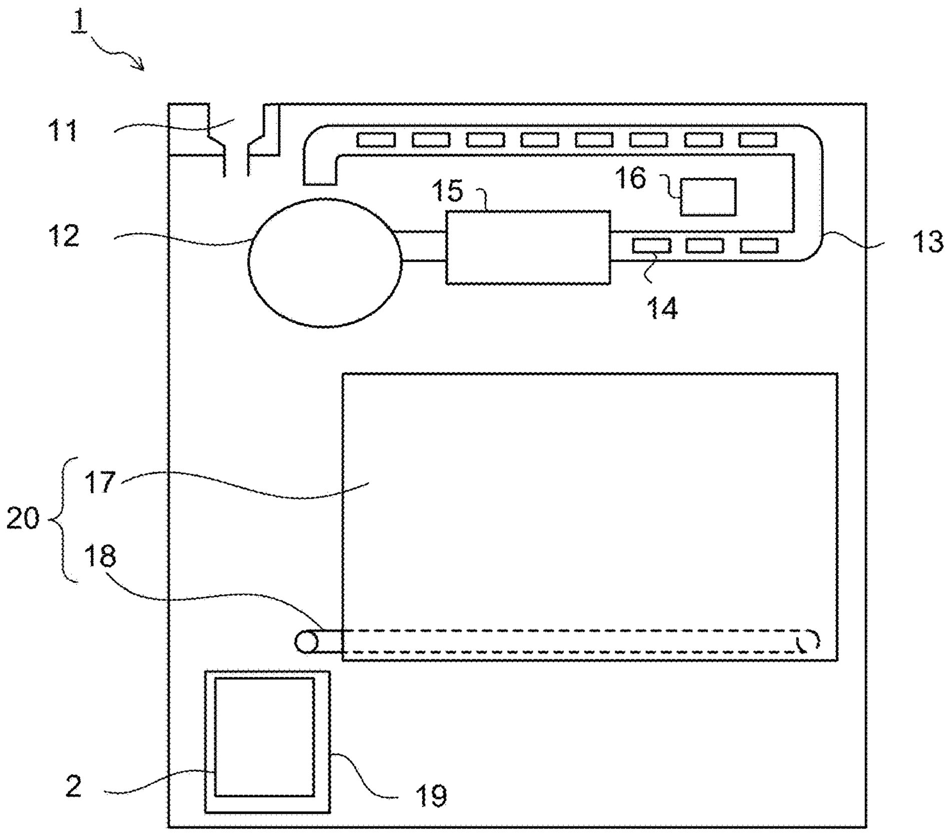
FIG. 2 is a schematic view illustrating an example of a money handling apparatus according to an embodiment.

FIG. 2 is a schematic diagram illustrating an example of a money handling apparatus according to the embodiment. A money handling apparatus 1 illustrated in FIG. 2 performs processing related to money. The processing related to money may include, for example, replenishment process, collection process, verification process, and the like. The money processed by the money handling apparatus 1 includes coins and banknotes, but in FIG. 2, the description will focus only on coins. Note that the shapes, positions, dimensions, and the like of each functional unit illustrated in FIG. 2 do not necessarily correspond to the actual shapes, positions, dimensions, and the like.

Here, money, coins, and banknotes are examples of media or valuable media. In the present embodiment, the coins include, but not limited to, a plurality of types of coins such as 0.01 dollar (1 cent) coins, 0.05 dollar (5 cent) coins, 0.1 dollar (10 cent) coins, 0.25 dollar (25 cent) coins, and 0.5 dollar (50 cent) coins. The banknote includes, but not limited to, a plurality of types of banknotes such as a one-dollar banknote, a two-dollar banknote, a five-dollar banknote, a ten-dollar banknote, a twenty-dollar banknote, a fifty-dollar banknote, and a one-hundred-dollar banknote. Further, the money may be a money other than the US money, such as Japanese money. Further, the technology according to the present disclosure may be applied to various media such as coins used in a game hall.

As illustrated in FIG. 2, the money handling apparatus 1 includes a depositing unit 11, a rotating disk 12, a transport unit 13, a plurality of diverter units 14, a recognition unit 15, a control unit 16, a storage unit 17, a dispensing unit 18, and a cassette attachment unit 19.

The depositing unit 11 has the cassette 2 detachably attached to, and receives coins from the cassette 2. The depositing unit 11 also accepts loose coins that are deposited manually. The depositing unit 11 may be referred to as a replenishing unit.

The rotating disk 12 supplies the coins deposited from the depositing unit 11 to the transport unit 13 one by one.

The transport unit 13 transports coins one by one.

Under the control of the control unit 16, the plurality of diverter units 14 switches the transport path of the coin being transported by the transport unit 13 to a path to the storage unit 17 or the like.

The recognition unit 15 recognizes and counts the coins being transported by the transport unit 13. The recognition unit 15 counts various coins while recognizing, for example, the authenticity, denomination (type), and correctness or damage of the coins. The recognition unit 15 outputs the recognition result and the counting result (number of coins) for each type of coin to the control unit 16.

The recognition unit 15 is configured to recognize the type of the money being transported by using, for example, a transport mechanism, an optical sensor, a magnetic sensor, a thickness detection sensor, and the like. Further, the sensor used in the recognition unit 15 is not limited to the above-described sensor, and another sensor or a combination of sensors may be used.

The control unit 16 controls the overall operation of the money handling apparatus 1. For example, the control unit 16 controls a diverter unit 14 based on the recognition result of the recognition unit 15, and performs control to switch the transport destination of the coin. Further, for example, the control unit 16 performs the processing described below with reference to FIG. 3 and the like.

The storage unit 17 stores the coins that have been transported by switching the transport path by the diverter unit 14. The storage unit 17 is capable of storing a plurality of types (denominations) of coins in a mixed manner. The storage unit 17 ejects the stored coins one by one to the dispensing unit 18. Further, the coins stored in the storage unit 17 may be transported to the recognition unit 15 via a transport unit (which may be the transport unit 13) under the control of the control unit 16, recognized and counted by the recognition unit 15 for authenticity, denomination (type), and damage, and then returned from the recognition unit 15 to the storage unit 17 via the transport unit 13 and the diverter unit 14.

The dispensing unit 18, composed of a belt conveyor, transports the coins ejected from the storage unit 17, for example. The dispensing unit 18 may be referred to as a dispensing unit or a rejection unit.

At the cassette attachment unit 19, the cassette 2 can be attached and detached. That is, the cassette 2 is detachably attached to the cassette attachment unit 19. The cassette attachment unit 19 may be included in the lower unit of the money handling apparatus 1. The lower unit may be drawn out from or pushed into the money handling apparatus 1.

Note that the storage unit 17 and the dispensing unit 18 constitute a coin supply unit 20. The coin supply unit 20 supplies coins to the cassette 2 attached to the cassette attachment unit 19.

Figure 3:
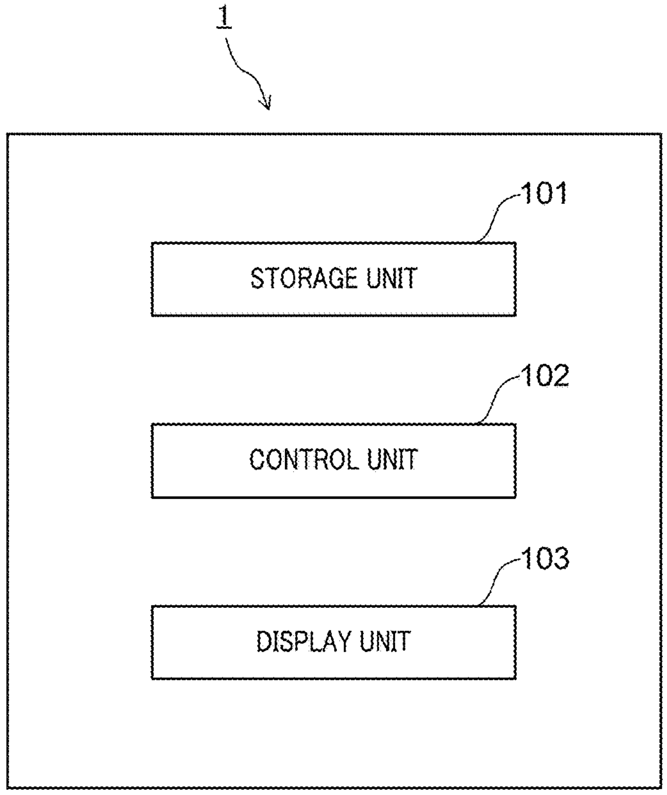
FIG. 3 is a block diagram illustrating an example of a configuration of the money handling apparatus according to the embodiment.

FIG. 3 is a block diagram illustrating an example of a configuration of the money handling apparatus according to the embodiment. FIG. 3 schematically illustrates an example of the main components of the money handling apparatus 1.

As illustrated in FIG. 3, the money handling apparatus 1 includes a storage unit 101 (corresponding to the storage unit 17 illustrated in FIG. 2), a control unit 102 (corresponding to the control unit 16 illustrated in FIG. 2), and a display unit 103. It is a matter of course that the money handling apparatus 1 may include other functional units such as a storage unit (storage device) in addition to the functional units described with reference to FIG. 2.

The storage unit 101 is, for example, a mixed stacker or a mix stacker. The storage unit 101 is a mixed storage unit that stores money and is capable of storing a plurality of types of money. The number of storage units 101 is not limited to one, and a plurality of storage units 101 may be provided. In the present embodiment, the storage unit 101 is capable of storing a plurality of types of coins, including 0.01 dollar coins, 0.05 dollar coins, 0.1 dollar coins, 0.25 dollar coins, and 0.5 dollar coins in a mixed manner. On the other hand, it is assumed that each of a plurality of storage units different from the coin storage unit 101 is capable of storing each of a plurality of types of banknotes including a one-dollar banknote, a two-dollar banknote, a five-dollar banknote, a ten-dollar banknote, a twenty-dollar banknote, a fifty-dollar banknote, and a one-hundred-dollar banknote. Note that the storage unit 101 may be capable of storing a plurality of types of banknotes, including one-dollar banknotes, two-dollar banknotes, five-dollar banknotes, ten-dollar banknotes, twenty-dollar banknotes, fifty-dollar banknotes, and one-hundred-dollar banknotes in a mixed manner, and in this case, the technology according to the present disclosure may be applied to the plurality of types of banknotes.

The control unit 102 may be a general-purpose processing apparatus (which may be referred to as a processor, a control unit, or the like) or a dedicated processing apparatus. The control unit 102 may be, for example, a central processing unit (CPU).

The functions of the elements disclosed in the present specification can be implemented using a general-purpose processor, a special-purpose processor, an integrated circuit, an ASIC (Application Specific Integrated Circuit), an FPGA (Field Programmable Gate Array), or a circuit or processing circuit including a conventional processor. The disclosed functions may also be implemented using circuitry that is configured or programmed to perform the functions, or any combination thereof, by using one or more programs stored in one or more memories. Since the processor includes transistors and other circuits therein, the processor is considered to be a processing circuit or a circuit. In the present disclosure, a circuit, a unit, or a means is hardware that performs the described function or is programmed to perform the described function. The hardware may be any hardware disclosed herein that is programmed or configured to perform the described functions.

The control unit 102 compares the number of money (also referred to as the stored number) stored in the storage unit 101 for each type of money with a predetermined number set for the type of money. Next, in a case of a first situation in which the number of the money is larger than a predetermined number set for the type of money, the control unit 102 outputs information indicating the first situation, and in a case of a second situation in which the number of the money is smaller than the predetermined number set for the type of money, the control unit 102 outputs information indicating the second situation. For example, the control unit 102 outputs information indicating the first situation, information indicating the second situation, and the like to the display unit 103 to perform control to cause the display unit 103 to display the information. As described later, a display such as a tablet may be used instead of the display unit 103.

Further, in a case of a third situation in which a certain type of money is not stored in the storage unit 101, the control unit 102 may output information indicating the third situation, and in a case of a fourth situation in which the number of certain type of money stored in the storage unit 101 is equal to a predetermined number set for the type of money, the control unit 102 may output information indicating the fourth situation.

In this manner, the control unit 102 outputs information indicating the first situation, information indicating the second situation, and the like, thereby prompting the user of the money handling apparatus 1 to comply with the appropriate number. As a result, it is possible to enhance the possibility of smooth operation of the money handling apparatus 1.

The control unit 102 can acquire the number of money stored in the storage unit 101 for each type of money based on information on the recognition result and the counting result (number of money) of each type of money output by the recognition unit 15.

The predetermined number set for each type of money means the appropriate number set for each type of money. The appropriate number represents the number set such that the money handling apparatus 1 can operate appropriately in a case where a plurality of types of money are stored in the storage unit 101. The appropriate number set for each type of money is, for example, a number set so that the ratio of the number of each type of money to the total number of money that can be stored in the storage unit 101 is within a predetermined range. The range of the ratio of each type of money is set, for example, so that the ratio of each coin of denomination is substantially equal to each other. Alternatively, the range of the ratio of each type of money is set to a ratio, for example, based on experimental data, so that each one coin of denomination can be dispensed within a predetermined time. The range of the ratio of each type of money is further set, such that the ratio of more frequently withdrawn type of money is larger than that of other types of money, for example, based on the frequency of withdrawals, so that frequently withdrawn types of money are more likely to be dispensed. The predetermined number may be set by the user of the money handling apparatus 1 and stored in a storage unit provided in the money handling apparatus 1, or may be set by a manufacturer in a manufacturing stage of the money handling apparatus 1 and stored in the storage unit provided in the money handling apparatus 1. The control unit 102 is capable acquire the predetermined number (appropriate number) for each type of money by reading the information stored in the storage unit. The predetermined number may be changeable or may be fixed.

The display unit 103 is, for example, a display (display apparatus) such as a liquid crystal display or a touch display. The display unit 103 displays information indicating the first situation, the second situation, the third situation, the fourth situation, and the like, which are output by the control unit 102, and other information under the control of the control unit 102.

According to the above, the excess or deficiency of the number of stored corresponding money (the information indicating the first situation and the information indicating the second situation) with respect to the predetermined number (appropriate number) set for each type of money is output to (or displayed on) the display unit 103. Thus, the user of the money handling apparatus 1 can immediately understand which type of money is biased in the money handling apparatus 1 and can intuitively determine the timing of processing such as replenishment or collection of money. As a result, it is possible to increase the possibility of smooth operation of the money handling apparatus 1, and the money handling apparatus 1 is likely to perform operations appropriately.

Figure 4:
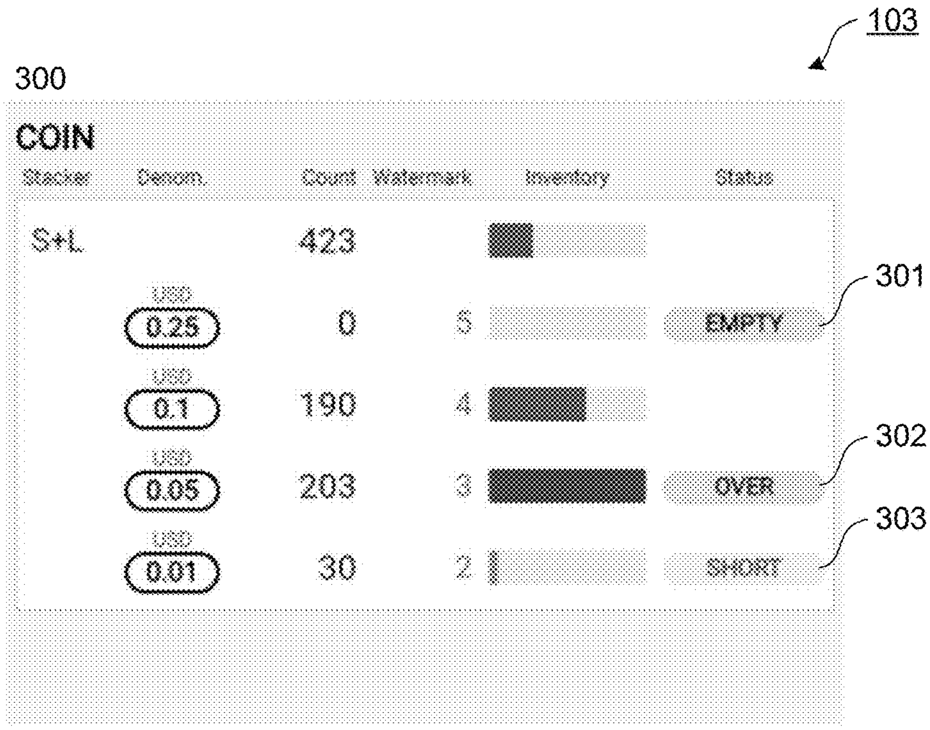
FIG. 4 is a diagram illustrating an example of a display screen according to the embodiment.

FIG. 4 is a diagram illustrating an example of a display screen according to the embodiment.

As illustrated in FIG. 4, an exemplary display screen 300 displayed on the display unit 103 includes items such as "Denom." (abbreviation for Denomination) (money to be handled), "Count" (number of stored coins), and "Status" (excess or deficiency of the number of stored coins with respect to the appropriate number) for "COIN" (coin).

In "Denom.", information indicating a 0.25 dollar coin, information indicating a 0.1 dollar coin, information indicating a 0.05 dollar coin, and information indicating a 0.01 dollar coin are displayed. That is, the 0.25 dollar coin, the 0.1 dollar coin, the 0.05 dollar coin, and the 0.01 dollar coin are the coins to be handled by the money handling apparatus 1 in this example.

In "Count", the total number of the stored target money handled by the money handling apparatus 1 ("423"), the number of stored 0.25 dollar coins ("0"), the number of stored 0.1 dollar coins ("190"), the number of stored 0.05 dollar coins ("203"), and the number of stored 0.01 dollar coins ("30") are displayed.

In "Status", for 0.25 dollar coins, information indicating a third situation in which the number of stored coins is 0 ("EMPTY") is displayed as an icon 301. For the 0.05 dollar coin, information indicating a first situation in which the number of stored coins is larger than the appropriate number of coins ("OVER") is displayed as an icon 302. For the 0.01 dollar coin, information indicating a second situation in which the number of stored coins is less than the appropriate number ("SHORT") is displayed as an icon 303. The display related to "Status" illustrated in FIG. 4 is implemented by the control unit 102 outputting to the display unit 103 information indicating a situation corresponding to the result of the comparison between the number of money of a plurality of types stored in the storage unit 101 and the appropriate number set for each type of money as described above. For the information indicating the first situation and the information indicating the second situation, different colorings may be applied for easy determination for the user of the money handling apparatus 1.

In an example, when the user of the money handling apparatus 1 selects an instruction for performing replenishment (deposit) on the menu screen displayed on the display unit 103 and gives the instruction to the money handling apparatus 1, the control unit 102 and the display unit 103 may perform the following processing.

The control unit 102 calculates a first number (C=B−A) by subtracting the number (A) of the money stored in the storage unit 101 from a predetermined number (B) set for each type of money, and outputs information indicating the calculated first number (C). For example, the control unit 102 outputs information indicating the first number of each type of money to the display unit 103, and performs control to cause the display unit 103 to display the information. The display unit 103 displays information indicating the first number output by the control unit 102.

According to the above, by outputting (displaying) the (initial) number (first number) up to the predetermined number (appropriate number) set for each type of money to (on) the display unit 103, the user of the money handling apparatus 1 can determine the number up to the predetermined number at a glance. As a result, it is possible to increase the possibility of smooth operation of the money handling apparatus 1, and the money handling apparatus 1 is likely to perform operations appropriately.

In a case where the user of the money handling apparatus 1 selects an instruction for performing replenishment (deposit) on the menu screen displayed on the display unit 103 and gives the instruction to the money handling apparatus 1, the control unit 102 and the display unit 103 may further perform the following processing.

In a case where a certain type (first type) of money among the plurality of types of money is newly stored in the storage unit 101 by the replenishment process, the control unit 102 outputs information indicating a second number (E=C−D=B−A−D) obtained by subtracting the number (D) of first type of money newly stored in the storage unit 101 from the first number (C) corresponding to the first type of money. For example, the control unit 102 outputs information indicating the second number (E) corresponding to the first type of money to the display unit 103, and performs control to cause the display unit 103 to display the information. The display unit 103 displays information indicating the second number output by the control unit 102 instead of information indicating the first number corresponding to the first type of money. That is, the number up to a predetermined number is displayed on the display unit 103 by counting down by the number of supplied money.

According to the above, even in a case where the first type of money is supplied, the user of the money handling apparatus 1 can determine at a glance the number of money up to the predetermined number (appropriate number) set for the first type of money by outputting (displaying) the number of money (second number) up to the predetermined number (appropriate number) set for the first type of money to the display unit 103 in consideration of the supplied number of money. As a result, it is possible to increase the possibility of smooth operation of the money handling apparatus 1, and the money handling apparatus 1 is likely to perform operations appropriately.

Figure 5:
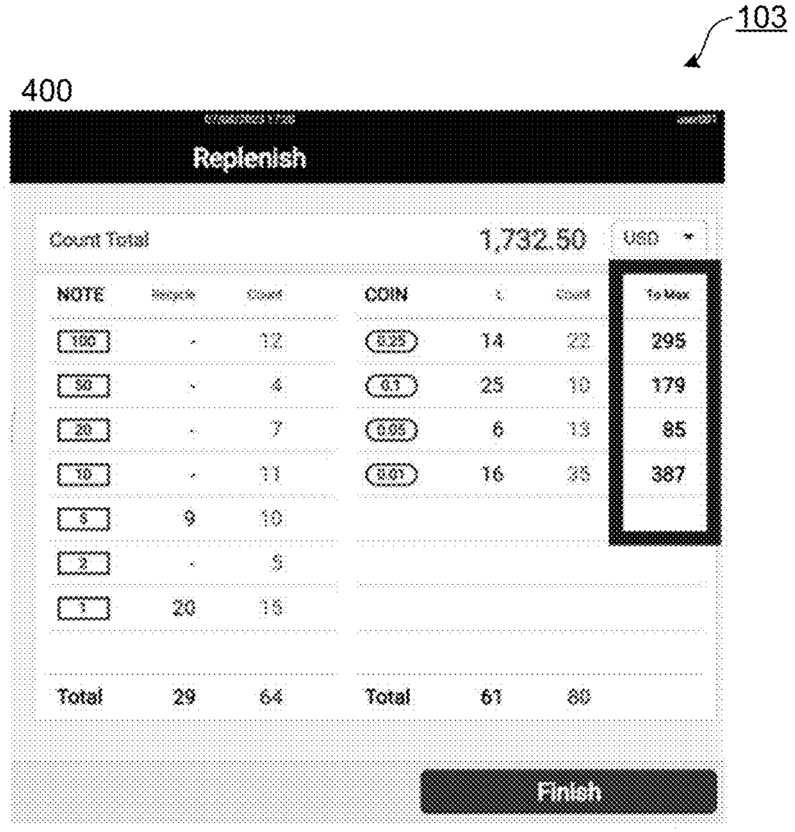
FIG. 5 is a diagram illustrating another example of the display screen according to the embodiment.

FIG. 5 is a diagram illustrating another exemplary display screen according to the embodiment.

An exemplary display screen 400 illustrated in FIG. 5 is an example of a display screen when the user of the money handling apparatus 1 selects an instruction for performing replenishment of money ("Replenish") in the menu screen displayed on the display unit 103.

As illustrated in FIG. 5, the display screen 400 includes items such as the total amount of money "Count Total" to be supplied in the money handling apparatus 1, the type of "NOTE" (banknote), "Recycle" (the number of banknotes originally stored) and "Count" (the number of banknotes to be supplied) corresponding to each type of banknote, the type of "COIN" (coin), "L" (the number of coins originally stored), "Count" (the number of coins to be supplied), and "ToMax" (the number of coins up to the appropriate number, that is, the appropriate number-(the number of coins originally stored+the number of coins to be supplied)) corresponding to each type of coin.

In "ToMax" surrounded by a thick line, information indicating the number (second number) up to the appropriate number (295 coins) is displayed for the 0.25 dollar coin, and similar information is displayed for the 0.1 dollar coin, the 0.05 dollar coin, and the 0.01 dollar coin. In the initial state, the display related to "ToMax" illustrated in FIG. 5 is implemented when the control unit 102 calculates the first number (C) by subtracting the number of the money stored in the storage unit 101 from a predetermined number set for the type of money, and outputs information indicating the calculated first number to the display unit 103 as described above. Each time the user of the money handling apparatus 1 supplies coins, the numerical value (second number of coins (E)) displayed in the corresponding "ToMax" decreases by the number of supplied coins.

In a case where the user of the money handling apparatus 1 selects an instruction for performing replenishment (deposit) on the menu screen displayed on the display unit 103 and gives the instruction to the money handling apparatus 1, the control unit 102 may further perform the following processing.

In a case where a certain type (second type) of money among the plurality of types of money is newly stored in the storage unit 101 by the replenishment process, and the number of second type of money stored in the storage unit 101 exceeds a predetermined number set for the second type of money, the control unit 102 calculates a third number by subtracting the predetermined number set for the second type of money from the number of second type of money stored in the storage unit 101, and performs control to eject (or reject) the second type of money by the third number (for example, from the dispensing unit 18). That is, the second type of money is ejected from the money handling apparatus 1 by the amount exceeding the predetermined number of the second type of money such that a predetermined number of the second type of money is stored in the money handling apparatus 1 (the storage unit 101).

Ejection Control

Details of the above-described ejection control will be supplementally described below. The transport mechanism includes a transport motor, a drive pulley, a driven pulley, and an endless transport belt. A roller may be used instead of the transport belt, or a combination of both may be used. The money deposited from the depositing unit 11 of the money handling apparatus 1 is transported along the transport path by the transport mechanism, and the type of the money is recognized by the recognition unit 15 provided on the transport path. In a case where the recognition result is the first type of money, the control unit controls the transport mechanism to transport the money to the storage unit 101, and in a case where the recognition result is the second type of money, the control unit controls the transport mechanism to transport the money to the dispensing unit 18.

According to the above, in a case where the second type of money is supplied in excess of the predetermined number, it is possible to avoid or suppress the occurrence of a timeout or the like due to a biased number of stored money by performing a control such that a predetermined number of the second type of money is stored in the money handling apparatus 1 (the storage unit 101). As a result, it is possible to increase the possibility of smooth operation of the money handling apparatus 1, and the money handling apparatus 1 is likely to perform operations appropriately.

In an example, when the user of the money handling apparatus 1 selects an instruction for performing a verification to determine the inventory amount of money in the money handling apparatus 1 in the menu screen displayed on the display unit 103 and gives the instruction to the money handling apparatus 1, the control unit 102 may perform the following processing.

In the verification process, even when a certain type (third type) of money among the plurality of types of money is newly stored in the storage unit 101 and the number of the third type of money stored in the storage unit 101 exceeds a predetermined number set for the third type of money, the control unit 102 does not perform control to reject the third type of money. That is, in the verification process, the number up to the predetermined number, such as information indicating first number (C) or information indicating second number (E), is not displayed on the display unit 103, and it is possible to store the third type of money exceeding the predetermined number in the money handling apparatus 1 (the storage unit 101).

In the verification process, the money stored in the money handling apparatus 1 is once dispensed, and the dispensed money is supplied into the money handling apparatus 1 again, thereby determining the inventory amount of money in the money handling apparatus 1. According to the above, in the verification process, it is possible to perform the control of allowing for replenishment of money exceeding a predetermined number. As a result, it is possible to increase the possibility of smooth operation of the money handling apparatus 1, and the money handling apparatus 1 is likely to perform operations appropriately.

In one example, the user of the money handling apparatus 1 selects an instruction for performing the collection in the menu screen displayed on the display unit 103 to give the instruction to the money handling apparatus 1, and the money handling apparatus 1 performs the collection process in response to the instruction. When performing the collection process, the control unit 102 performs control to preferentially collect the coin the number which stored in the storage unit 101 is larger than the predetermined number set for the coin among a plurality of types of money (coins). Then, the control unit 102 performs control to collect the remaining amount with banknotes after calculating the amount of coins to be collected preferentially. If a fraction still occurs, the control unit 102 performs control to collect the fraction with coins.

As described at the beginning, in a case where a certain type of money (for example, 0.25 dollar coins) is stored in the storage unit 101 in a biased manner (in a larger amount), a timeout may occur before a 0.01 dollar coin reaches the transport path when attempting to collect 0.05 dollars (five 0.01 dollar coins), and the desired amount may not be collected. Further, at present, in amount collection, the number of coins to be collected is calculated to be the minimum configuration number for the collection amount. For this reason, since the above-described bias is not considered, there may be cases where only an amount less than the specified amount can be collected. According to the above, on the other hand, in the collection process, the coins that are stored in the storage unit 101 in a biased manner (more than the appropriate number) are preferentially collected, so that it is possible to collect the specified amount and to avoid or suppress the occurrence of a timeout due to the number of stored coins larger than the appropriate number. Further, by considering the appropriate number, the collection process is reduced, enabling efficient operation in the next operation. As a result, it is possible to increase the possibility of smooth operation of the money handling apparatus 1, and the money handling apparatus 1 is likely to perform operations appropriately.

Figure 6:
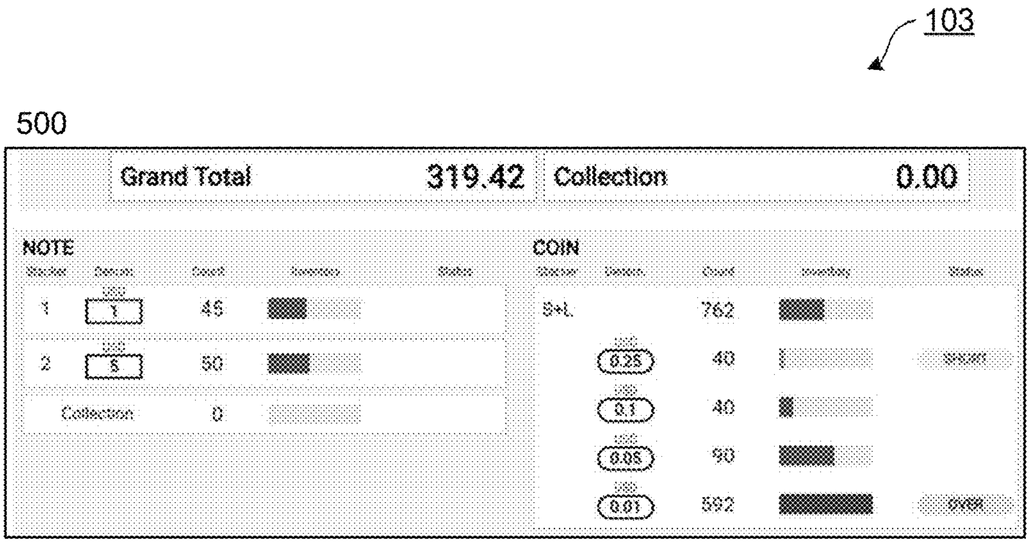
FIG. 6 is a diagram illustrating still another example of the display screen according to the embodiment.

FIG. 6 is a diagram illustrating still another exemplary display screen according to the embodiment.

An exemplary display screen 500 illustrated in FIG. 6 is an example of an initial screen that is displayed when the user of the money handling apparatus 1 selects an instruction for performing money collection ("Collect") in the menu screen displayed on the display unit 103.

As illustrated in FIG. 6, the display screen 500 includes items such as the total amount of money stored in the money handling apparatus 1 "Grand Total", "Collection" (total collection amount of money), the type of "NOTE" (banknote), "Count" (storage number) corresponding to each type of banknote, the type of "COIN" (coin), "Count" (storage number) corresponding to each type of coin, and "Status" (situation such as excess or deficiency).

Here, the appropriate numbers of 0.25 dollar coins, 0.1 dollar coins, 0.05 dollar coins, and 0.01 dollar coins are assumed to be 331, 221, 110, and 442, respectively, and the lower limit numbers of 0.25 dollar coins, 0.1 dollar coins, 0.05 dollar coins, and 0.01 dollar coins are assumed to be 41, 27, 13, and 55, respectively. Note that the lower limit number of coins is set as a guideline for dispensing the necessary amount of change, regardless of the amount of money deposited. Further, it is assumed that the user of the money handling apparatus 1 gives an instruction to leave 105.24 dollars in the money handling apparatus 1 (that is, to collect 214.18 dollars, i.e., 319.42-105.24 dollars).

First, the control unit 102 calculates the inventory amount (the total amount of money stored in the money handling apparatus 1)−the amount to be left (step A). In this example, the inventory amount (319.42 dollars)−the amount to be left (105.24 dollars)=214.18 dollars holds. Note that, in the case where the collection amount is specified, this processing is omitted.

Next, the control unit 102 detects a type of money the stored number of which is larger than the appropriate number (step B). In this example, the control unit 102 detects the 0.01 dollar coin (592 (storage number)>442 (appropriate number)) as a type of money the stored number of which is larger than the appropriate number.

Next, the control unit 102 determines how many of the coins detected in step B are required to reach the coin amount that is calculated in step A (step C). In this example, the control unit 102 determines that the amount of coins is reached with 18 0.01 dollar coins (0.18 dollars÷0.01 dollars).

Next, the control unit 102 calculates the remaining amount to be collected (step D). In this example, the remaining amount is 214.18 dollars−0.18 dollars=214 dollars holds.

Next, taking into account the lower limit number of the coins detected in step B and a predetermined first margin number, the control unit 102 calculates the maximum number of the coins that is an integer when using only the coins (step E). In this example, the first margin number is assumed to be 20, and the control unit 102 calculates the maximum number of 0.01 dollar coins as 400 because 0.01 dollars×400=4 dollars holds. Here, in a case where 400 0.01 dollar coins are used, considering the sum of the lower limit number of coins and the first margin number of coins, 475 coins, 400 coins+55 coins (lower limit number of coins)+20 coins (first margin number of coins), need to be stored in the storage unit 101. As a result of step C, since 574 0.01 dollar coins, 592 (original storage number)−18 sheets (result of step C), are stored in the storage unit 101, there is no problem in using 400 0.01 dollar coins. On the other hand, in a case where 500 0.01 dollar coins are used, considering the sum of the lower limit number of coins and the first margin number of coins, 575 coins, 500 coins+55 coins (lower limit number of coins)+20 coins (first margin number of coins), need to be stored in the storage unit 101. As a result of step C, since 574 0.01 dollar coins are stored in the storage unit 101, it is not possible to use 500 0.01 dollar coins. Thus, the control unit 102 calculates the maximum number of 0.01 dollar coins as 400.

Next, with respect to the coins that can be collected in consideration of the lower limit number, the control unit 102 detects the type of coin the stored number of which is larger than the sum of the lower limit number and a predetermined second margin number among the remaining types of coins (step F). In this example, the second margin number is assumed to be 20, and the control unit 102 detects the 0.05 dollar coin (90 coins (storage number)>33 coins (13 coins (lower limit number)+20 coins (second margin number))) as the type of coin the stored number of which is larger than the sum of the lower limit number and the second margin number.

Next, the control unit 102 calculates the maximum number of the coins that is an integer when using only the coins, taking into account the lower limit number of the coins detected in step F and the second margin number (step G). In this example, the control unit 102 calculates the maximum number of 0.05 dollar coins as 40 because 0.05 dollars×40 coins=2 dollars holds. Here, in a case where 40 0.05 dollar coins are used, considering the sum of the lower limit number of pieces and the second margin number, 73 coins, 40 coins+13 coins (lower limit number of pieces)+20 coins (second margin number), need to be stored in the storage unit 101. Since 90 0.05 dollar coins are stored in the storage unit 101, there is no problem in using 40 0.05 dollar coins. On the other hand, in a case where 60 0.05 dollar coins are used, 93 coins, 60 coins+13 coins (lower limit number of coins)+20 coins (second margin number), need to be stored in the storage unit 101 in consideration of the sum of the lower limit number of coins and the second margin number. Since 90 0.05 dollar coins are stored in the storage unit 101, it is not possible to use 60 0.05 dollar coins. Thus, the control unit 102 calculates the maximum number of 0.05 dollar coins as 40.

Next, the control unit 102 calculates the remaining amount to be collected (step H). In this example, the remaining amount is 214 dollars−4 dollars (Step E)−2 dollars (Step G)=208 dollars.

In a case where there is no longer a coin that can be collected in consideration of the lower limit number of coins, the control unit 102 next determines how many banknotes are required to reach the remaining 208 dollars. In this example, the control unit 102 determines that 208 dollars can be reached with 41 five-dollar banknotes and 3 one-dollar banknotes because 41 five-dollar banknotes+3 one-dollar banknotes=208 dollars holds.

Through the above processing, the money handling apparatus 1 will collect 41 five-dollar banknotes, 3 one-dollar banknotes, 40 0.05 dollar coins, and 418 0.01 dollar coins.

Note that, in step B, when two or more types of money are detected, the money the stored number of which is larger than the appropriate number may be processed first in the subsequent step, or the money to be processed first may be randomly selected. In step F, the same processing may be performed even when two or more types of coins are detected.

Further, the lower limit number, the first margin number, the second margin number, and the like set for each type of coin may be set by the user of the money handling apparatus 1 and stored in the storage unit provided in the money handling apparatus 1, or may be set by the manufacturer in the manufacturing stage of the money handling apparatus 1 and stored in the storage unit provided in the money handling apparatus 1. The control unit 102 acquires the lower limit number, the first margin number, the second margin number, and the like for each type of money by reading the information stored in the storage unit. The lower limit number, the first margin number, the second margin number, and the like may be changeable or may be fixed.

In an example, when the user of the money handling apparatus 1 selects an instruction for performing a collection in the menu screen displayed on the display unit 103 and gives the instruction to the money handling apparatus 1, the money handling apparatus 1 may perform the following processing.

The control unit 102 receives the number of coins to be collected that is input (specified) by the user of the money handling apparatus 1 into the display unit 103. Next, the control unit 102 determines whether the storage unit 101 is in a verification state. Here, the verification state refers to a state in which the inventory amount of some or all types of coins stored in the storage unit 101 is not yet determined. The control unit 102 can determine whether the storage unit 101 is in the verification state by reading flag information stored in the storage unit that indicates whether the storage unit is in the verification state. In a case where the storage unit 101 is in the verification state, the control unit 102 performs a control such that various coins stored in the storage unit 101 are recognized and counted by the recognition unit 15 while transporting the various coins by the transport unit 13 and/or another transport unit and that the recognized and counted various coins are dispensed from the dispensing unit 18. In a case where the storage unit 101 is not in the verification state, the control unit 102 performs a control such that various coins stored in the storage unit 101 are dispensed from the dispensing unit 18 while transporting the various coins by the transport unit 13 and/or another transport unit without recognizing the various coins stored in the storage unit 101 by the recognition unit 15. Next, the money handling apparatus 1 receives all the various coins dispensed from the dispensing unit 18 from the user of the money handling apparatus 1 at the depositing unit 11. Subsequently, the control unit 102 performs a control such that the received various coins are recognized and counted by the recognition unit 15 while transporting the various coins by the transport unit 13 and/or another transport unit, that the coins corresponding to the specified collection target coins are dispensed from the dispensing unit 18, and that the coins not corresponding to the specified collection target coins are stored in the storage unit 101.

Note that, this collection process can be performed without touching the coins by setting the cassette 2 in the dispensing unit 18 to perform the collection and then setting that cassette 2 after the collection in the depositing unit 11.

At present, a money handling apparatus using a mixed stacker performs collection by means of total collection/cassette removal or the like. According to the above, on the other hand, it is possible to collect the specified amount while avoiding the occurrence of a timeout in the collection process. Further, it is possible to shorten the time required for collection compared to the situation at present.

Figure 7:
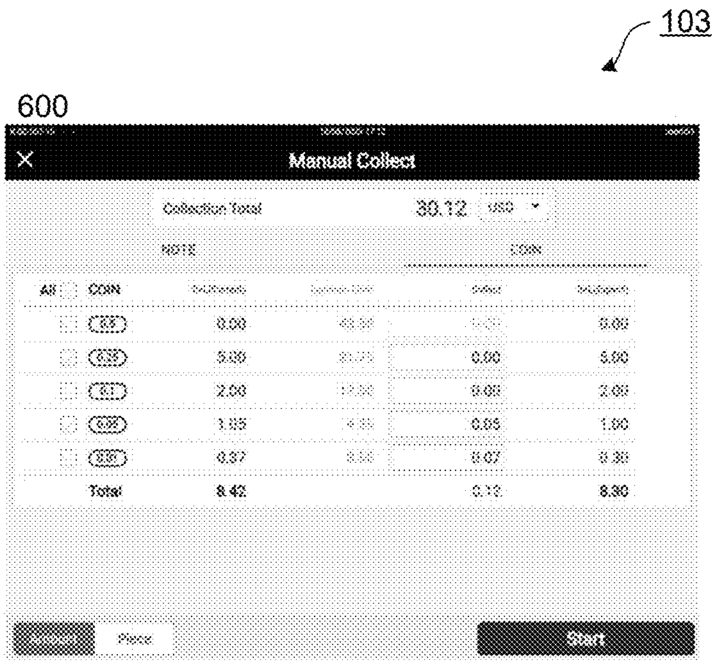
FIG. 7 is a diagram illustrating still another example of the display screen according to the embodiment.

FIG. 7 is a diagram illustrating still another example of a display screen according to the embodiment.

An exemplary display screen 600 illustrated in FIG. 7 is an example of a display screen when the user of the money handling apparatus 1 selects an instruction for performing money collection ("Collect") (more specifically, manual collection "Manual Collect") in the menu screen displayed on the display unit 103.

As illustrated in FIG. 7, the display screen 600 includes items such as the total collection amount ("Collection Total": 30.12 dollars) that the user of the money handling apparatus 1 wants to collect, and the collection amount for each coin ("Collect": 0.05 dollar coin×1, 0.01 dollar coin×7) that the user wants to collect. The display screen 600 also displays the inventory amount of money stored in the money handling apparatus 1 (referred to as pre-collection inventory amount) and the number of each type of stored money (storage amount).

Through the above-described collection process, one 0.05 dollar coin and seven 0.01 dollar coins, which are the coins to be collected, are dispensed. The user of the money handling apparatus 1 can determine whether all the temporarily dispensed coins have been deposited by calculating the difference between the pre-collection inventory amount and the storage amount (storage value) of various types of money after collection, and comparing the calculated difference with the dispensed coins.

Operation of Money Handling Apparatus

Next, the operation of the money handling apparatus will be described.

Figure 8:
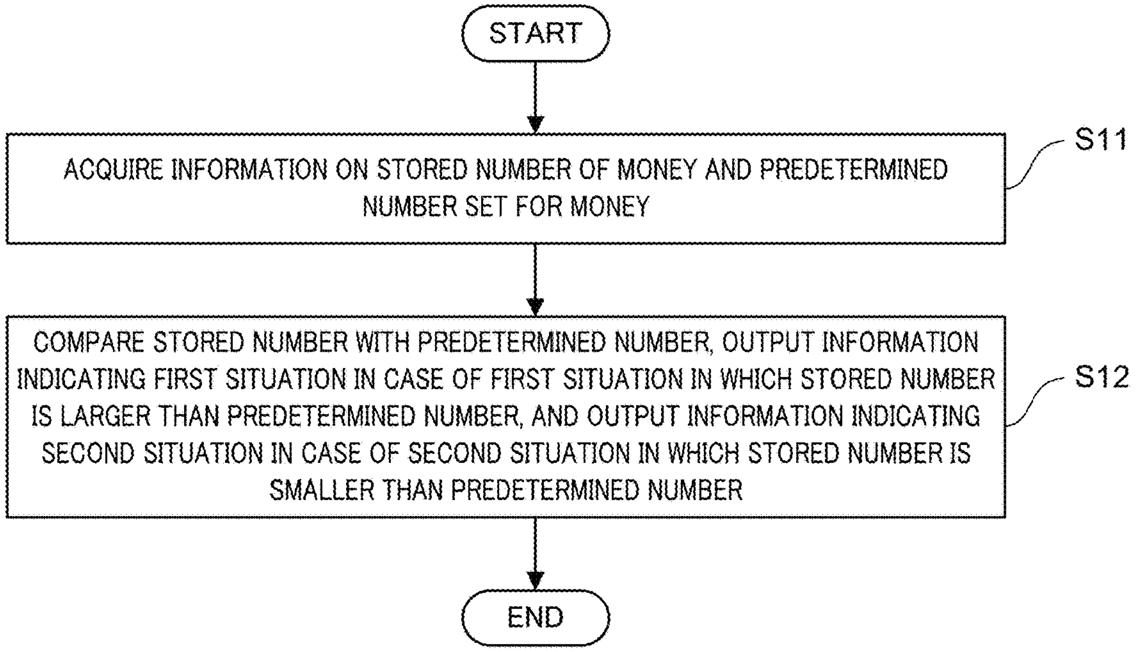
FIG. 8 is a flowchart illustrating an operation example of the money handling apparatus according to the embodiment.

FIG. 8 is a flowchart illustrating an operation example (method of outputting information on a money) of the money handling apparatus according to the embodiment.

In step S11, the money handling apparatus 1 acquires information on the number of money stored in the storage unit 101 and a predetermined number of money set for the money.

For example, in step S11, the control unit 102 acquires information on the number of money from the recognition unit 15 and acquires a predetermined number of money set for the money from the storage unit.

In step S12, the money handling apparatus 1 compares the number of money stored in the storage unit 101 for each type of money with the predetermined number set for the type of money. In a first situation where the number of the money is larger than the predetermined number set for the type of money, information indicating the first situation is output, and in a second situation where the number of the money is smaller than the predetermined number set for the type of money, information indicating the second situation is output.

For example, in step S12, the control unit 102 outputs information indicating the first situation, information indicating the second situation, and the like to the display unit 103 to perform control to cause the display unit 103 to display the information. Thus, the display unit 103 displays information indicating the first situation, the second situation, and the like output by the control unit 102.

According to the above, the excess or deficiency of the number of stored corresponding money (the information indicating the first situation and the information indicating the second situation) with respect to the predetermined number (appropriate number) set for each type of money is output to (or displayed on) the display unit 103. Thus, the user of the money handling apparatus 1 can intuitively determine the timing of processing such as replenishment or collection of money at a glance.

Note that, other processes described in the "Configuration of Money Handling Apparatus" section may be additionally executed in the operation example described with reference to the above flowchart.

Figure 9:
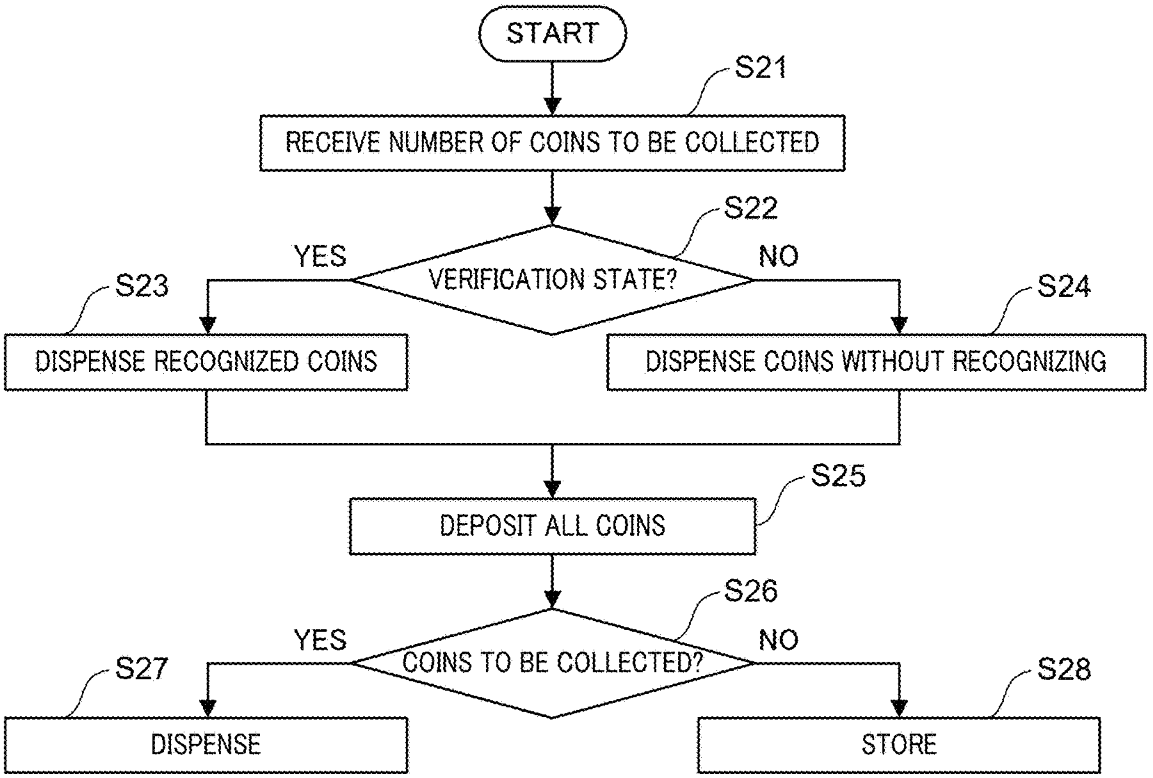
FIG. 9 is a flowchart illustrating another operation example of the money handling apparatus according to the embodiment.

FIG. 9 is a flowchart illustrating another operation example of the money handling apparatus according to the embodiment. Note that, in the present operation example, it is assumed that the user of the money handling apparatus 1 selects an instruction for performing the collection in the menu screen displayed on the display unit 103 and gives the instruction to the money handling apparatus 1 before the start of this flow.

In step S21, the money handling apparatus 1 receives an instruction for the number of coins to be collected, which is input (specified) by the user of the money handling apparatus 1 into the display unit 103.

In step S22, the money handling apparatus 1 determines whether the storage unit 101 is in the verification state.

In a case where the storage unit 101 is in the verification state (step S22; YES), in step S23, the money handling apparatus 1 recognizes and counts various coins while transporting the various coins, and dispenses the recognized and counted various coins from the dispensing unit 18. Next, the flow proceeds to step S25.

In a case where the storage unit 101 is not in the verification state (step S22; NO), in step S24, the money handling apparatus 1 dispenses various coins from the dispensing unit 18 while transporting the various coins without recognizing the various coins. Next, the flow proceeds to step S25.

In step S25, the money handling apparatus 1 receives all the various coins dispensed in step S23 or S24 at the depositing unit 11.

In step S26, the money handling apparatus 1 recognizes and counts the various coins that have been deposited (received), and determines whether the various coins are the coins to be collected specified in step S21.

In a case where the coin is a coin to be collected (step S26; YES), in step S27, the money handling apparatus 1 dispenses the coin from the dispensing unit 18 while transporting the coin.

In a case where the coin is not a coin to be collected (step S26; NO), in step S28, the money handling apparatus 1 stores the coin in the storage unit 101 while transporting the coin.

Modification Example of Embodiment

In the above, an example has been described in which, during the replenishment process, control is performed to impose a restriction (perform a rejection) when the number of money supplied exceeds a predetermined number (appropriate number). Similarly, in the collection process, the control may be performed such that the money handling apparatus 1 automatically collects the money by the amount exceeding the predetermined number such that the money exceeding the predetermined number is dispensed from the money handling apparatus 1. In this case, the money handling apparatus 1 may always perform the collection automatically, or may perform the collection automatically only when a setting for automatic collection is made by the user of the money handling apparatus 1. Further, in this case, the type (denomination) to be automatically collected may be fixed, or may be settable by the user of the money handling apparatus 1.

In the above, an example of control in which the biased coin is preferentially collected in the collection process has been described. Similarly, it is possible to perform collection control such that when an appropriate collection for collecting coins while leaving an appropriate number of coins is enabled in the remaining collection, the number of the coins equal to or more than the appropriate number of coins becomes the appropriate number. Further, even during the dispense/change replenishment, control may be performed to preferentially dispense biased coins.

In the above, an example has been described in which information indicating these situations is output in accordance with the first situation in which the number stored is larger than the appropriate number and the second situation in which the number stored is smaller than the appropriate number. However, the first situation and/or the second situation may be divided into a plurality of situations in stages. For example, the second situation may be divided into a 2-1 situation the stored number of which is less than the appropriate number and is equal to or more than the first predetermined number, a 2-2 situation the stored number of which is less than the first predetermined number and is equal to or more than the second predetermined number, and the like. This enables more specific control.

In the above, an example in which information indicating the first situation is displayed on the display unit 103 provided in the money handling apparatus 1 has been described. However, such information may be displayed on a display unit provided in an external terminal (for example, a Point of Sales (POS) terminal, a KIOSK terminal, a personal computer, a tablet, a smartphone, or the like) for remotely operating the money handling apparatus 1. That is, the money handling apparatus 1 may output (transmit) such information to an external terminal to control the display of the information on a display unit provided in the external terminal. Further, the processing executed by the above-described money handling apparatus 1 may be instructed through an external terminal. In this manner, when the money handling apparatus 1 and the external terminal communicate with each other, the money handling apparatus 1 and the external terminal may have a configuration (for example, a corresponding communication module, a communication interface, or the like) capable of being connected to each other via one or more of the Internet, a wired LAN (Local Area Network), a wireless LAN, a mobile communication network, a short-range communication link (for example, Bluetooth (registered trademark)), or the like.

An aspect of the present disclosure may be implemented as a program for implementing the functions of the above-described money handling apparatus 1. For example, the money handling apparatus 1 may be implemented by a computer. Such a computer executes the above-described program stored in a storage device or a storage medium, or downloaded from an external apparatus (for example, a server apparatus). Thus, the program can function as a functional unit (such as the control unit 102 illustrated in FIG. 3) that causes a computer to implement the functions described above, or it can cause a computer to execute the processes described above (such as the processes illustrated in FIGS. 8 and 9).

The invention claimed is:

1. A money handling apparatus, comprising:

a mixed storage unit configured to store a plurality of types of money;

a control unit that, for each type of the plurality of types of money, compares a number of money stored in the mixed storage unit with a predetermined number set for the type of money, outputs information indicating a first situation to a display in a case of the first situation, and outputs information indicating a second situation to the display in a case of the second situation, the first situation being a situation where the number of money stored in the mixed storage unit is larger than the predetermined number set for the type of money, the second situation being a situation where the number of money stored in the mixed storage unit is smaller than the predetermined number set for the type of money; and the display displaying the information indicating the first situation and the information indicating the second situation.

2. The money handling apparatus according to claim 1, wherein for each type of the plurality of types of money, the control unit calculates a first number and outputs information indicating the first number, the first number being obtained by subtracting the number of money stored in the mixed storage unit from the predetermined number set for the type of money.

3. The money handling apparatus according to claim 2, wherein in a case where a first type of money among the plurality of types of money is newly stored in the mixed storage unit, the control unit outputs information indicating a second number, the second number being obtained by subtracting the number of the first type of money newly stored in the mixed storage unit from the first number corresponding to the first type of money.

4. The money handling apparatus according to claim 1, wherein in a case where a second type of money among the plurality of types of money is newly stored in the mixed storage unit and the number of the second type of money stored in the mixed storage unit exceeds a predetermined number set for the second type of money, the control unit calculates a third number and performs control to eject the second type of money by the third number, the third number being obtained by subtracting the predetermined number set for the second type of money from the number of the second type of money stored in the mixed storage unit.

5. The money handling apparatus according to claim 1, wherein in a verification process for determining an inventory amount of the money in the money handling apparatus, the control unit does not perform control to eject a third type of money even when the third type of money among the plurality of types of money is newly stored in the mixed storage unit and the number of the third type of money stored in the mixed storage unit exceeds a predetermined number set for the third type of money.

6. The money handling apparatus according to claim 1, wherein the plurality of types of money includes a plurality of types of coins; and wherein when performing a collection process, the control unit performs control to preferentially collect a type of coin whose number is larger than a predetermined number set for the type of coin among the plurality of types of coins stored in the mixed storage unit.

7. The money handling apparatus according to claim 1, wherein the display is provided in an external terminal different from the money handling apparatus.

8. The money handling apparatus according to claim 1, wherein the information indicating the first situation and the information indicating the second situation are displayed as icons on the display.

9. The money handling apparatus according to claim 1, wherein the information indicating the first situation and the information indicating the second situation are in different colors on the display.

10. The money handling apparatus according to claim 1, wherein the predetermined number set for the type of money is an appropriate number representing a number set for each type of money such that a ratio of a number of each type of money to a total number of money storable in the at least one mixed storage unit is within a predetermined range.

11. The money handling apparatus according to claim 1, wherein the control unit outputs information indicating a third situation to the display in a case of the third situation, and outputs information indicating a fourth situation to the display in a case of the fourth situation, the third situation being a situation where a certain type of money is not stored in the mixed storage unit, the fourth situation being a situation where the number of certain type of money stored in the mixed storage unit is equal to the predetermined number set for the type of money, the display further displaying the information indicating the third situation and the information indicating the fourth situation.

12. A method of outputting information on a money in a money handling apparatus including a mixed storage unit configured to store a plurality of types of money, the method comprising:

acquiring information on a number of the plurality of types of money stored in the mixed storage unit and a predetermined number set for the plurality of types of money;

comparing, for each type of the plurality of types of money, a number of money stored in the mixed storage unit with a predetermined number set for the type of money, outputs information indicating a first situation in a case of the first situation, and outputs information indicating a second situation in a case of the second situation, the first situation being a situation where the number of money stored in the mixed storage unit is larger than the predetermined number set for the type of money, the second situation being a situation where the number of money stored in the mixed storage unit is smaller than the predetermined number set for the type of money; and displaying the information indicating the first situation and the information indicating the second situation on a display.

13. The method according to claim 12, further comprising:

transmitting the information indicating the first situation and the information indicating the second situation to an external terminal; and displaying the information indicating the first situation and the information indicating the second situation on the display of the external terminal.

* * * * *